(12) United States Patent
Richards (10) Patent No.: US 8,024,244 B2
(45) Date of Patent: Sep. 20, 2011

(54) SYSTEMS AND METHODS FOR PROVIDING A PERSONALIZED EXCHANGE MARKET

(76) Inventor: Christopher Richards, New York, NY (US)

( * ) Notice: Subject to any disclaimer, the term of this patent is extended or adjusted under 35 U.S.C. 154(b) by 0 days.

(21) Appl. No.: 12/821,319

(22) Filed: Jun. 23, 2010

(65) Prior Publication Data

US 2010/0299240 A1 Nov. 25, 2010

Related U.S. Application Data

(63) Continuation of application No. 11/759,422, filed on Jun. 7, 2007, which is a continuation of application No. 11/552,393, filed on Oct. 24, 2006.

(60) Provisional application No. 60/766,663, filed on Feb. 3, 2006, provisional application No. 60/767,328, filed on Mar. 17, 2006.

(51) Int. Cl.
*G06Q 40/00* (2006.01)
(52) U.S. Cl. ............................................. 705/35; 705/37
(58) Field of Classification Search ..................... 705/35, 705/37
See application file for complete search history.

(56) References Cited

U.S. PATENT DOCUMENTS

| | | | |
|---|---|---|---|
| 5,713,793 A | 2/1998 | Holte | |
| 5,987,435 A | 11/1999 | Weiss | |
| 6,134,536 A | 10/2000 | Shepherd | |
| 6,236,900 B1 | 5/2001 | Geiger | |
| 6,321,212 B1 | 11/2001 | Lange | |
| 6,390,472 B1 | 5/2002 | Vinarsky | |
| 6,456,982 B1 | 9/2002 | Pilipovic | |
| 6,601,044 B1 | 7/2003 | Wallman | |
| 7,225,153 B2 | 5/2007 | Lange | |
| 2001/0049649 A1 | 12/2001 | Baecker | |
| 2001/0049650 A1 | 12/2001 | Moshal | |
| 2001/0049651 A1 | 12/2001 | Selleck | |
| 2002/0004787 A1 | 1/2002 | Moshal | |
| 2002/0032643 A1 | 3/2002 | Himmelstein | |
| 2002/0099640 A1 | 7/2002 | Lange | |
| 2002/0147670 A1 | 10/2002 | Lange | |
| 2003/0014351 A1 | 1/2003 | Neff | |
| 2003/0033212 A1 | 2/2003 | Sandhu | |

(Continued)

FOREIGN PATENT DOCUMENTS

WO PCT/US2006/015956 11/2006

OTHER PUBLICATIONS

Newsfutures, Prediction Market by NewsFutures, Jan. 21, 2006, http://us.newsfutures.com.
Iowa Electronic Markets, Iowa Electronic Markets FAQ, Jan. 21, 2006, http://www.biz.uiowa.edu/iem/faq.html.

(Continued)

*Primary Examiner* — Harish T. Dass
*Assistant Examiner* — Michael D Cranford
(74) *Attorney, Agent, or Firm* — James J. Ruttler (57) ABSTRACT

The present invention relates to systems and methods for providing a personalized exchange market, and more specifically, to systems and methods for establishing personalized pledge agreements for uncertain future events or occurrences. In one embodiment, the invention includes a method including the steps of facilitating a pledge offer via a network, the pledge offer specifying an outcome of an uncertain future occurrence, the uncertain future occurrence being independently definable; facilitating an acceptance of the pledge offer over via the network, the acceptance forming a pledge agreement; determining the outcome; and facilitating performance of the pledge agreement based on the outcome.

20 Claims, 6 Drawing Sheets

U.S. PATENT DOCUMENTS

| | | | |
|---|---|---|---|
| 2003/0115128 A1 | 6/2003 | Lange | |
| 2003/0208432 A1 | 11/2003 | Wallman | |
| 2003/0236738 A1* | 12/2003 | Lange et al. | 705/37 |
| 2004/0064394 A1 | 4/2004 | Wallman | |
| 2004/0111358 A1 | 6/2004 | Lange | |
| 2004/0193530 A1* | 9/2004 | Hausman | 705/37 |
| 2004/0254803 A1 | 12/2004 | Myr | |
| 2005/0015323 A1 | 1/2005 | Myr | |
| 2006/0059065 A1 | 3/2006 | Glinberg | |
| 2006/0155588 A1 | 7/2006 | Kibar | |
| 2006/0167779 A1 | 7/2006 | Turner | |
| 2007/0162365 A1 | 7/2007 | Weinreb | |

OTHER PUBLICATIONS

The Economist; Market, market, on the wall; Dec. 10, 2005; vol. 377 Iss. 8456 p. 12.

Saporito, Bill; Place your bets!; Time; Oct. 24, 2005; vol. 166, Iss. 17 p. 76.

Davies, Gavyn; G2: back page: Gavyn Davies does the maths; The Guardian; Oct. 20, 2005; p. 36; London, UK.

Rowan, David; The next big thing; The Times; Oct. 8, 2005; p. 12; London, UK.

Allo, Enda D. Layuk; Prediction markets facilitate better decision and policy making; The Jakarta Post; Jun. 6, 2005; p. 6; Jakarta, Indonesia.

Wireless News; Yahoo! Research Labs and O'Reilly Media team for tech buzz game; Mar. 16, 2005; p. 1.

Ray, Russ; Prediction markets: crystal ball for finance?; Financial Executive; May 2004; vol. 20, Iss. 3; p. 24; Morristown, USA.

Ray, Russ; Prediction markets: betting on risk management; Risk Management; Apr. 2004; vol. 51, Iss. 4; p. 58; New York, USA.

Wolfers, Justin; Prediction markets; The Journal of Economic Perspectives; Spring 2004; vol. 18, Iss. 2; p. 107; Nasville, USA.

Berg, Joyce; Prediction markets as decision support systems; Information Systems Frontiers; Jan. 2003; vol. 5, Iss. 1, p. 79; Kluwer Academic Publishers; Netherlands.

Gruca, Thomas; The effect of electronic markets on forecasts of new product success; Information Systems Frontiers; Jan. 2003; vol. 5, Iss. 1; p. 95; Kluwer; Netherlands.

The Foresight Exchange; Welcome to the foresight exchange; Oct. 24, 2006; www.ideosphere.com/fx/docs/fxdocs.cgi.

Hedgestreet; What is Hedgstreet?; Oct. 24, 2006; www.hedgestreet.com/faq.

ABG Bet; About ABG Bet; Oct. 24, 2006; www.abgbet.com/en/content.asp?section=about.

Inkling Markets, Write and Manage Your Own Market, May 8, 2006, www.inklingmarkets.com.

* cited by examiner

SYSTEMS AND METHODS FOR PROVIDING A PERSONALIZED EXCHANGE MARKET

PRIORITY CLAIM

This application is a Continuation of application Ser. No. 11/759,422 filed Jun. 7, 2007, which application is a Continuation of application Ser. No. 11/552,393 filed Oct. 24, 2006, which application is a Non-Provisional of Provisional Application No. 60/766,663 filed Feb. 3, 2006 and Provisional Application No. 60/767,328 filed Mar. 17, 2006. This application claims priority to each of the foregoing applications. The foregoing applications are hereby incorporated by reference in their entirety as if fully set forth herein.

FIELD OF THE INVENTION

This invention relates to systems and methods for providing a personalized exchange market, and more specifically, to systems and methods for establishing personalized pledge agreements for uncertain future events or occurrences.

BACKGROUND OF THE INVENTION

The future is inherently uncertain. This uncertainty encompasses uncertain future events or occurrences at both the macro- and micro-levels. Uncertain future events or occurrences may include anything in the future, including outcomes, measurements, processes, developments, discoveries and, of course, events or occurrences. Further, the uncertainty is indiscriminate to the time frame for which it operates, for both near and future events or occurrences may have a degree of unpredictability. For instance, it is uncertain whether inflation will rise, fall, or stay the same in the coming months. It is also uncertain whether, and to what degree, the price of a family home will increase, decrease, or stay the same over a given time period. And, it is uncertain whether a single child will marry before a certain age or remain a dependent until a certain age. Indeed, the uncertainty encompasses all perspective levels, from broad to narrow, for all future time periods, for all tangible and intangible subject matter. For many, this uncertainty brings excitement; however, the uncertainty also presents the risk that certain events or occurrences do not occur as anticipated, leading in some instances to financial losses or disappointment. In these instances, it would be desirable to predict, manage, guarantee, assure, or speculate in risks for future uncertain events or occurrences.

First, predicting uncertain future events or occurrences would be desirable for planning and making more informed or less risky decisions. For instance, if inflation is predicted to rise, it may be prudent to prepare for interest rate increases by minimizing mortgage payments or paying off debt. Also, if the real estate prices in a particular neighborhood are predicted to increase, it may be desirable to make real estate purchases before this anticipated increase. Further, if a child is predicted to marry, it may be wise to plan for wedding expenses or even the possibility of his/her being "jilted" and losing a banquet hall or reception deposit. Certainly, few would argue that accurate predictions of uncertain future events or occurrences are not valuable. Yet, achieving accurate predictions has been elusive in surveys, questionnaires, censuses, evaluations, assessments, or any other forecasts. Predictions often have error margins due to lack of motivation, lack of a tangible incentive, or inherent prejudice in the phrasing of questions. Further, pollees are sometimes not capable of giving informed opinions, completely answering the poll, satisfying the poller, thereby diminishing the accuracy of the poll itself. Similarly, expert opinions are limited in that they constitute, at most, only a few viewpoints, are sometimes obsolete, are founded on past rather than future performance, and are not easily verifiable. Thus, more accurate predictions of uncertain future events or occurrences would be desirable.

Next, managing the risks in uncertain future events or occurrences would be desirable for hedging against incorrect predictions, biases, or assumptions about the future. For instance, as discussed above, it would be beneficial to hedge against the risk of incorrectly converting variable rate loans to fixed rate loans under an assumption that interest rates were going to rise rather than fall. Similarly, as discussed above, it would be desirable to hedge against the risk of incorrectly purchasing a house in a particular neighborhood under the assumption that housing prices in that particular neighborhood would increase. Further, it would be beneficial to hedge against the risk of incorrectly investing in a particular ingredient for a drug under the assumption that the drug would ultimately gain FDA approval or achieve market success. Various institutions have pre-determined areas for risk management and have marketed and/or packaged these pre-determined products. However, pre-determined approaches do not provide risk management abilities for independently determinable uncertain future events or occurrences. For instance, there is no independently determinable risk-management system for whether a particular patent will be valuable, whether it will issue within a given time frame, or whether particular claims within the patent will be allowed by an examiner. Similarly, there is no independently determinable risk-management system for whether tomorrow will bring sunshine for a wedding or whether a particular product within a company will meet or surpass revenue forecasts. Further, there is no independently determinable risk-management system for whether a medical school graduate will be "matched" with a particular residency training program or remain jobless and still be responsible for medical school tuition debt. Without an independently determinable risk-management system an entity is unable to address particularly and precisely risks in uncertain future events or occurrences that are not pre-determined. Accordingly, an independently determinable risk-management system for any uncertain future event or occurrence would be desirable.

Also, as a complement to managing the risks of inherently uncertain future events or occurrences, it would be desirable to have an organized system for risk-bearing, speculative, profit-oriented, or otherwise motivated third parties to assume certain particular and precise risks in uncertain future events or occurrences from anyone, anywhere, for anything. For instance, it would be beneficial to provide an ability for one individual or entity to assume the risk of any independently determinable uncertain future event or occurrence, such as inflation changes, real estate market price changes, a marital status change, or adverse weather for a particular day and a precise location from another particular individual, small business, or other entity located anywhere in the world. Risk transfer systems to date are pre-determined, whereby a centralized person or organization pre-determines and/or packages the risks that may be transferred, which indirectly mandates the risk burden for all non-addressed uncertain future events or occurrences. Thus, it would be desirable to facilitate the transfer of any independently determinable uncertain future event or occurrence risk among any number of persons, anywhere, for anything.

What is needed then are systems and methods for providing a personalized exchange market, and more specifically, to systems and methods for establishing personalized pledge agreements for uncertain future events or occurrences.

SUMMARY OF THE INVENTION

The present invention relates to systems and methods for providing a personalized exchange market, and more specifically, to systems and methods for establishing personalized pledge agreements for uncertain future events or occurrences. In one embodiment, the invention includes a method including the steps of facilitating a pledge offer via a network, the pledge offer specifying an outcome of an uncertain future occurrence, the uncertain future occurrence being independently definable; facilitating an acceptance of the pledge offer via the network, the acceptance forming a pledge agreement; determining the outcome; and facilitating performance of the pledge agreement based on the outcome.

BRIEF DESCRIPTION OF THE DRAWINGS

Preferred and alternate embodiments of the present invention are described in detail below with reference to the following drawings.

DETAILED DESCRIPTION

The present invention relates to systems and methods for providing a personalized exchange market, and more specifically, to systems and methods for establishing personalized pledge agreements for uncertain future events or occurrences. Specific details of certain embodiments of the invention are set forth in the following description and in FIGS. 1-6 to provide an understanding of such embodiments. The present invention may have various combinations of embodiments, additional embodiments, or may be practiced without one or more of the details described for any particular embodiment.

Figure 1:
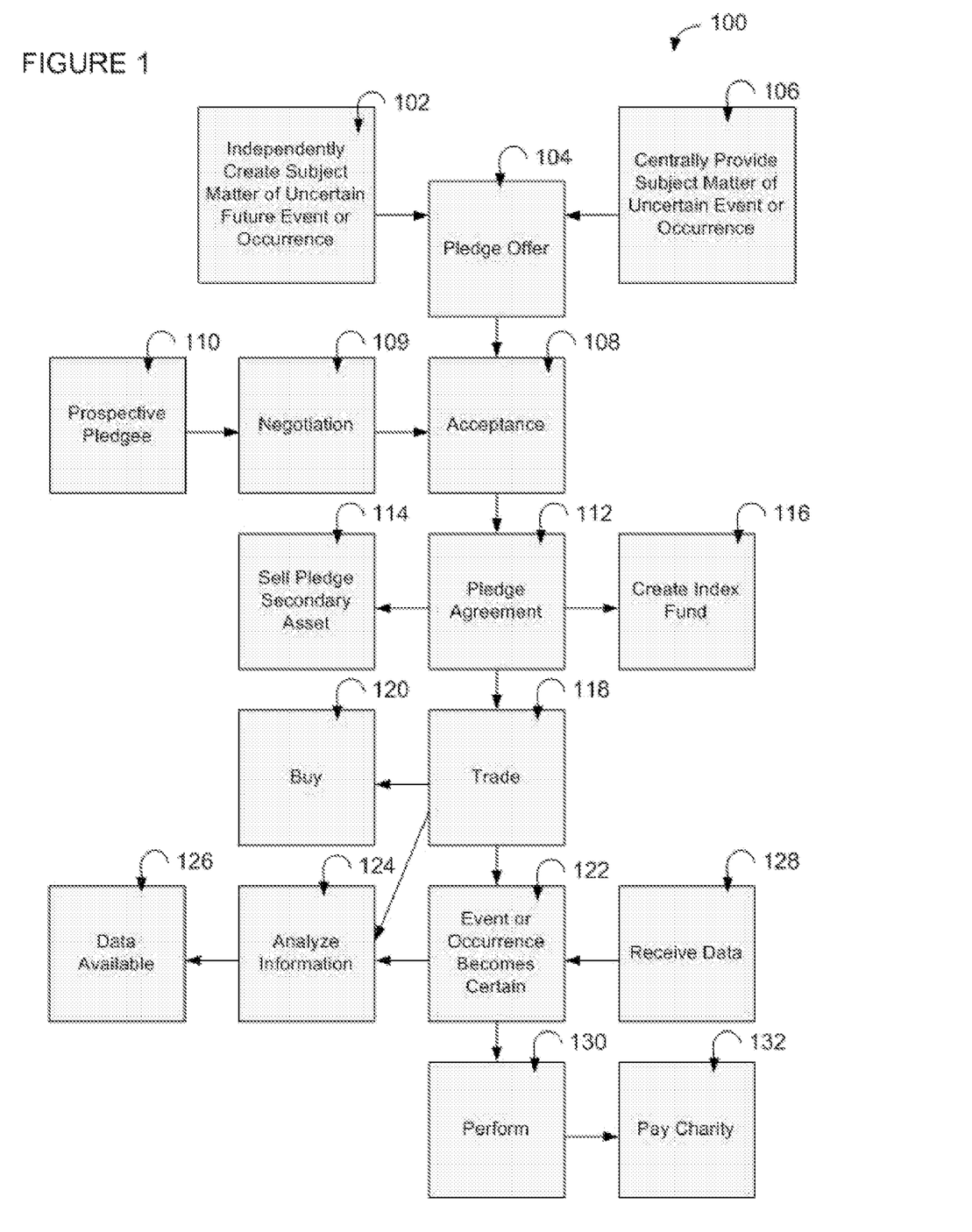
FIG. 1 is a block diagram of a method for performing in a personalized exchange market for any uncertain future event or occurrence in accordance with an embodiment of the invention.

FIG. 1 is a block diagram of a method for performing in a personalized exchange market for any uncertain future event or occurrence in accordance with an embodiment of the invention. An uncertain future event or occurrence may be anything in the future, including outcomes, measurements, processes, developments, discoveries and, of course, events or occurrences, whether intangible or tangible. In one embodiment, the method 100 includes a pledgor, or a pledge offerer, making a pledge offer to speculate on or transfer risk in any uncertain future event or occurrence at block 104. In certain embodiments, the uncertain future event or occurrence is independently determinable. In another embodiment, the pledge offer may be limited to a particular entity, group, or class. A prospective pledgee, or a pledge offeree, at block 110 reviews the pledge offer and accepts at block 108 or counter-pledges or makes another distinct pledge offer at negotiation block 109, which may be accepted at block 108. Alternatively, the prospective pledgee may decline the pledge offer. Thus, a pledge agreement is formed at block 112, wherein a pledgor agrees to speculate on or transfer risk in any uncertain future event or occurrence and a pledgee agrees to accept the risk transfer or speculate. In this manner, either the pledgor or the pledgee may enter the pledge agreement for the purpose of speculation, risk management, or any other purpose. The pledge agreement may involve contract law if applicable. Either the pledgor or the pledgee may optionally trade his or her interests in the pledge agreement at block 118 to another pledgee at block 120; this step may be unavailable as specified in the pledge agreement. The uncertain future event or occurrence becomes certain at block 122, optionally through an independently verifiable outcome, receiving data, or both at block 128; although in one particular embodiment, the pledge agreement may involve an indeterminable or questionable outcome, whereby the pledge agreement is dissolved. In one particular embodiment, a source of the data is predetermined or specified in the pledge agreement. Parties to the pledge agreement at the time the uncertain future event or occurrence becomes certain perform at block 130.

As an example, a pledgor may pledge offer $100 at block 104 that a particular piece of legislation or legislative amendment will pass. Assume the pledgor's business prospects would improve with non-passage of the legislation. A prospective pledgee at block 110 may accept the pledge offer at block 108 wherein a pledge agreement is formed at block 112. Thus, the pledge agreement would be $100 payable by the pledgee to the pledgor if the legislation passes and $100 payable by the pledgor to the pledgee if the legislation does not pass. Thus, the pledgor can either gain by improved business prospects through non-passage of the legislation or by the pledge agreement through passage of the legislation. As time progresses, either the pledgor or the pledgee may trade his or her interests in the pledge agreement to another pledgee at block 118. Thus, before the legislation even occurs, interests in the pledge agreement could fluctuate in value between $0 and $100, or without limit, depending on the perceived likelihood of the legislation either passing or not passing. If the legislation were likely to pass, the pledgor may find another pledgee for closer to or at $100. Otherwise, if the legislation were likely to not pass, the pledgor may find a buyer closer to or at $0. Thus, the trade information prior to the uncertain future event or occurrence is an incentivized representation of the perceived likelihood of the legislation passage; the information may be used for prediction purposes. The event or occurrence will become certain at block 122 when the legislation either passes or does not pass. If the legislation passes, the pledgor (or his assignees) will receive $100 at block 130. If the legislation does not pass, the pledgee (or her assignees) will receive $100 at block 130. In this example, the pledgor, the pledgee, or their assignees may engage in the method 100 for the purpose of speculation, as part of an overall risk strategy, or for any other purpose. Also, legislative amendments can be dealt with in the pledge agreement or as separate pledge agreements.

As another example, method 100 is applicable as a pledge-based methodology for establishing a medical value for a particular drug. In contrast with traditional methods of determining a medical value for a particular drug, including soliciting clinical patent input having large placebo error margins, the pledge-based methodology produces more accurate and incentivized results. In certain embodiments, participants in the pledge-based methodology for establishing a medical value for a particular drug are health care practioners. In other embodiments, incentives include research grants, stipends, or other rewards. In yet another embodiment, the pledge-based methodology for establishing the medical value of a drug supplements the traditional methods of determining the medical value.

In one particular embodiment, information is collected from any step in the method 100 and optionally analyzed at block 124. In an alternate embodiment, information is published, marketed, or otherwise made available at block 126, either in real-time or delay, and optionally includes a fee for access. In one particular embodiment, a consumer of the information at block 126 may act as a pledgor and define a pledge for an uncertain future event or occurrence to ensure that desired information for a particular event or occurrence is collectable at block 124.

In certain embodiments, the information may include, but is not limited to, prices, price changes, trade volume, trade rates, ranges of data, pledge frequencies, gains/losses, new pledgors/pledgees, most active pledgors/pledgees, most active pledge agreements, most productive pledge agreements, comparisons, or any other available data for trade purposes, prediction purposes, trend spotting purposes, insight purposes, decision making purposes, cost saving purposes, valuation purposes (e.g., of a particular patent or a right to purchase or to license the patent, before or after allowance), behavior guiding purpose, or any other purpose. In one particular embodiment, the information is weighted according to a pledgor's or pledgee's net worth, trading success, or any other factor; the weights and criteria may optionally be disclosed or kept confidential.

In certain embodiments, for example, predictions of the occurrence or non-occurrence of an uncertain future event or occurrence may be based on a current trading price or activity trend of an interest in a pledge agreement for that particular uncertain future event or occurrence. Alternatively, predictions may be based on current trading prices or activity of multiple interests in various pledge agreements. Other factors such as number of trades (sample size), price volatility (risk factor), time until maturity (maturity risk factor), and entities involved (weight factor) may optionally be considered when making predictions. Predictions may be expressed as a number, a range, a probability, or any other useful format. In certain embodiments, predictions may be updated over time as price, trade, volatility, maturity, and data involved for entities changes.

In another particular embodiment, the method 100 facilitates donating any proceeds to charity at block 132. In yet another particular embodiment, either the pledgor or the pledgee may optionally trade secondary assets in the pledge agreement. In yet a further embodiment, either the pledgor of the pledgee may optionally define alterations to the pledge agreement and transfer interests in the altered pledge agreement. In an alternative embodiment, the pledge agreement may be combined with other pledge agreements to form a personalized portfolio or index fund of pledge agreements at block 116. In yet a further embodiment, the pledge offer at block 104 may be a share or fractional share of a mutual fund of pledge agreements.

In yet another particular embodiment, the subject matter of any uncertain future event or occurrence is independently determined by any individual at block 102 without requiring consensus from another individual or entity, although some discretion as to content is optionally present. For example, discretion optionally includes filtering for obscenity or screening any proposed subject matter against existing pledge subject matter in order to ensure uniqueness of the independently determined uncertain future event or occurrence. Yet, in another embodiment, the subject matter of any uncertain future event or occurrence is pre-determined by any entity at block 106. Alternatively, the offer at block 104 may comprise a combination of individually selected and pre-determined uncertain future event or occurrences. In one embodiment, the uncertain future event or occurrence includes, but is not limited to, subject matter such as inflation changes, epidemic occurrences, legislation changes, whistle-blower activity, climate changes, global warming, treaty formation, population changes, sporting activities, industry changes, natural disaster occurrences, market shifts, popularity lists, popularity list changes, drug efficacy versus placebo, government decisions, scientific breakthroughs, fuel efficiency occurrences, housing price shifts, election results, interest rate changes, current event occurrences, court decisions, occupancy levels, zoning approvals, patent issuance, gas price changes, death occurrences, cosmetic procedures, website hits, steroid testing occurrences, new venture success, raw ingredient demands, number of vehicles on a thoroughfare, amount of rain in a day, the snowfall amount for a season, health of a CEO, engagement of a daughter, wealth changes of an individual, correlations, ratios, rankings, or any other uncertain future event or occurrence.

In an alternative embodiment, the method 100 includes margin accounts, escrow services, legal services, arbitration services, anonymous trades, or any other services. In yet a further embodiment, the performance at block 130 includes transfer of legal tender, virtual dollars, virtual points, additional pledge agreements, bartering, a combination thereof, or any other agreed upon trade. In one particular embodiment, any virtual dollars are exchangeable or transferable for legal tender. In one particular embodiment, the performance at block 130 includes prizes, products, or services from sponsors or advertisers. In one particular embodiment, the pledge offer at block 104 includes a binary pledge (i.e. only two possible outcomes) such as "yes" and "no" or "up" and "down." Further the pledge offer at block 104 may include a binary pledge as applied to lists such as a list rank order-change pledge, a list rank pledge (i.e., top ten, top five), a list index value pledge, a list member pledge, an on/off a list pledge, a new list member pledge, a relative list rank pledge, or an up/down pledge, any of which may be for variable loss or fixed loss and/or combinable.

In another particular embodiment, the pledge offer at block 104 is a one-to-one pledge or a one-to-many pledge. In another particular embodiment, the method 100 includes limits or restrictions based on experience level or risk level of any pledgor or pledgee. In a further embodiment, the pledge offer at block 104 includes the ability to target certain participants, to exclude certain participants, or to limit transferability of the pledge agreement. In an alternative embodiment, the offer at block 104 occurs at any time before and up until the uncertain future event or occurrence becomes certain (i.e. "in-running"). In yet a further particular embodiment, the pledge offer at block 104 may be repeated or altered as many times as desired. In an alternative embodiment, the method 100 includes chat rooms, blogs, P2P (person-to-person), or any other communication mediums to facilitate communication among pledgors, pledgees, or others. In one embodiment, the method 100 includes courses for information or skills improvement including, but not limited to, interactive courses and online courses. In a further embodiment, the pledge offer at block 104 is organizable by demographics, subject matter, time period, risk level, pledge offer or pledge agreement type, celebrity status, monetary value, IP address, or any other useful methodology. In one particular embodiment, the organizability of the pledge offer at block 104 is governed by preferences of the consumer of market data at block 126. In yet an alternate embodiment, the method 100 includes links to news or other information for enjoyment, education purposes, advertising revenue, or any other purpose. In one particular embodiment, the pledge agreement formed at block 112 is combinable, divisible, organizable, analyzable, or searchable by demographics, subject matter, time period, risk level, pledge offer or pledge agreement, pledge offer type, celebrity status, monetary value, or any other useful methodology. In another particular embodiment, the pledge agreement formed at block 112 optionally terminates before the uncertain future event or occurrence becomes certain at block 122. In another particular embodiment, the performance at block 130 is optionally usable or redeemable at partner companies for obtaining goods or services. In an alternate embodiment, the method 100 includes alerts, tickers, transaction fees, subscription fees, or any other fees. In yet a further embodiment, the method 100 is conducted via any wide area network, such as the internet. In an alternate embodiment, the method 100 includes any procedure or transaction type used in financial markets. In another embodiment, the pledge agreement does not have an expiration time period. In an alternative embodiment, any of the steps of method 100 are performable at any time. Method 100 is optionally repeatable in whole or in part.

Figure 2:
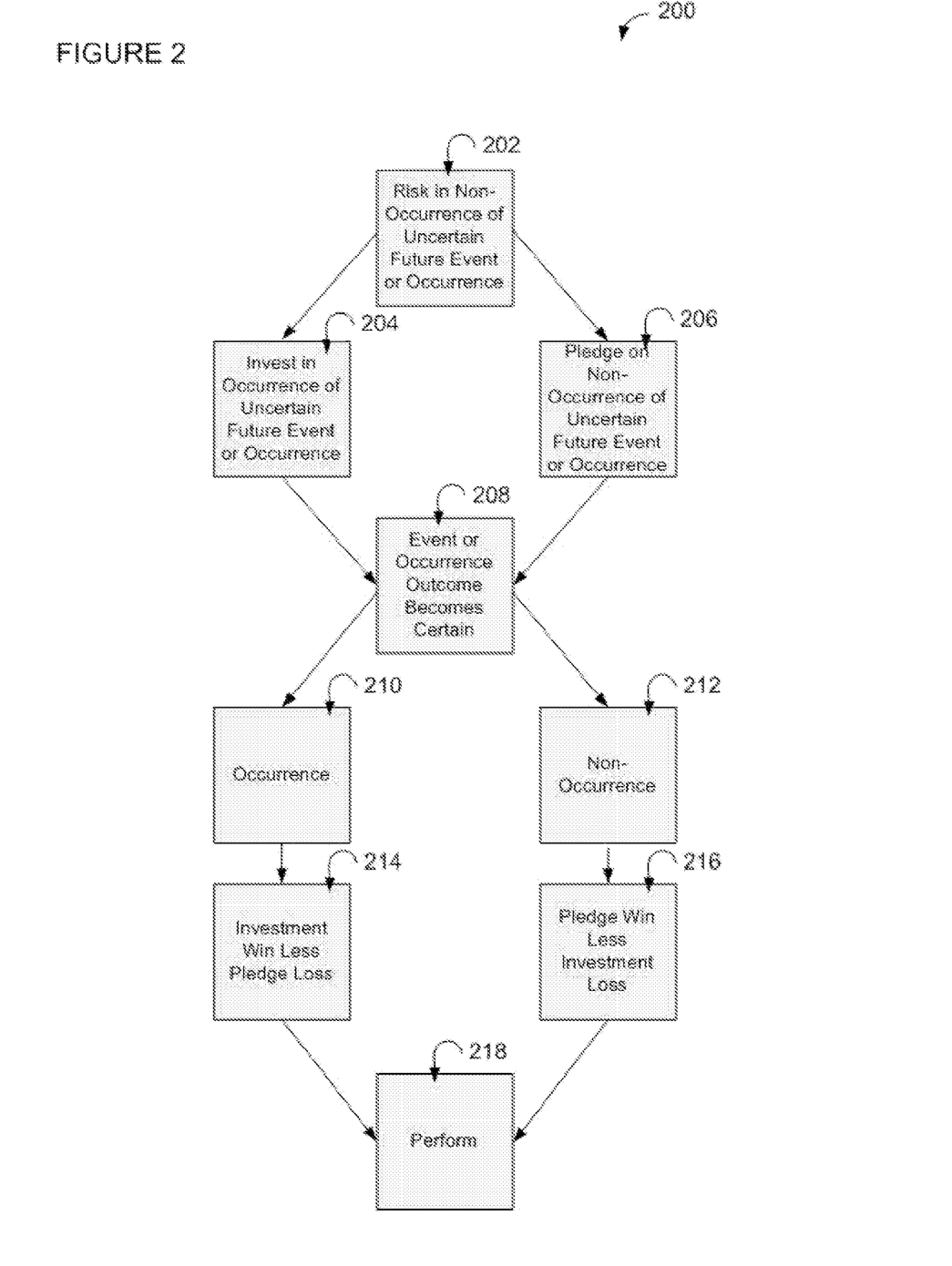
FIG. 2 is a block diagram of a method for hedging in a personalized exchange market for any uncertain future event or occurrence in accordance with an embodiment of the invention.

FIG. 2 is a block diagram of a method for hedging in a personalized exchange market for any uncertain future event or occurrence in accordance with an embodiment of the invention. In one embodiment, method 200 includes being presented with a risk of non-occurrence of an uncertain future event at block 202. The method 200 then includes investing in the occurrence of the uncertain future event at block 204 while also pledging on the non-occurrence of the uncertain event at block 206. This step or other steps of method 200 may include one or more of the embodiments discussed in relation to FIG. 1. In this regard, a hedge against losses is established for any uncertain future event or occurrence. When the event becomes certain at block 208 and the uncertain future event occurs at block 210, the method 200 includes subtracting a pledge loss (if any) from an investment profit (if any) at block 214 and making a payment transfer (if any) at block 218. However, when the event becomes certain at block 208 and the uncertain future event does not occur at block 212, the method 200 includes subtracting an investment loss (if any) from a pledge profit (if any) at block 216 and making a payment transfer (if any) at block 218. In one particular embodiment, method 200 further includes offsetting an already losing hedge by pledging on the opposite. In another particular embodiment a portfolio manager is available for assistance.

In one particular embodiment, the method 200 is reversible. In this embodiment, method 200 includes being presented with a risk in the occurrence of an uncertain future event. Accordingly, block 204 includes investing in the non-occurrence of the uncertain future event and block 206 includes pledging on the occurrence of the uncertain future event. Again, this step or other steps of method 200 may include one or more embodiments as discussed in relation to FIG. 1. Thus, when the event becomes certain at block 208 and does not occur at block 210, block 214 includes subtracting a pledge loss (if any) from an investment profit (if any). Similarly, when the event becomes certain at block 208 and occurs at block 212, block 216 includes subtracting an investment loss (if any) from a pledge profit (if any).

Figure 3:
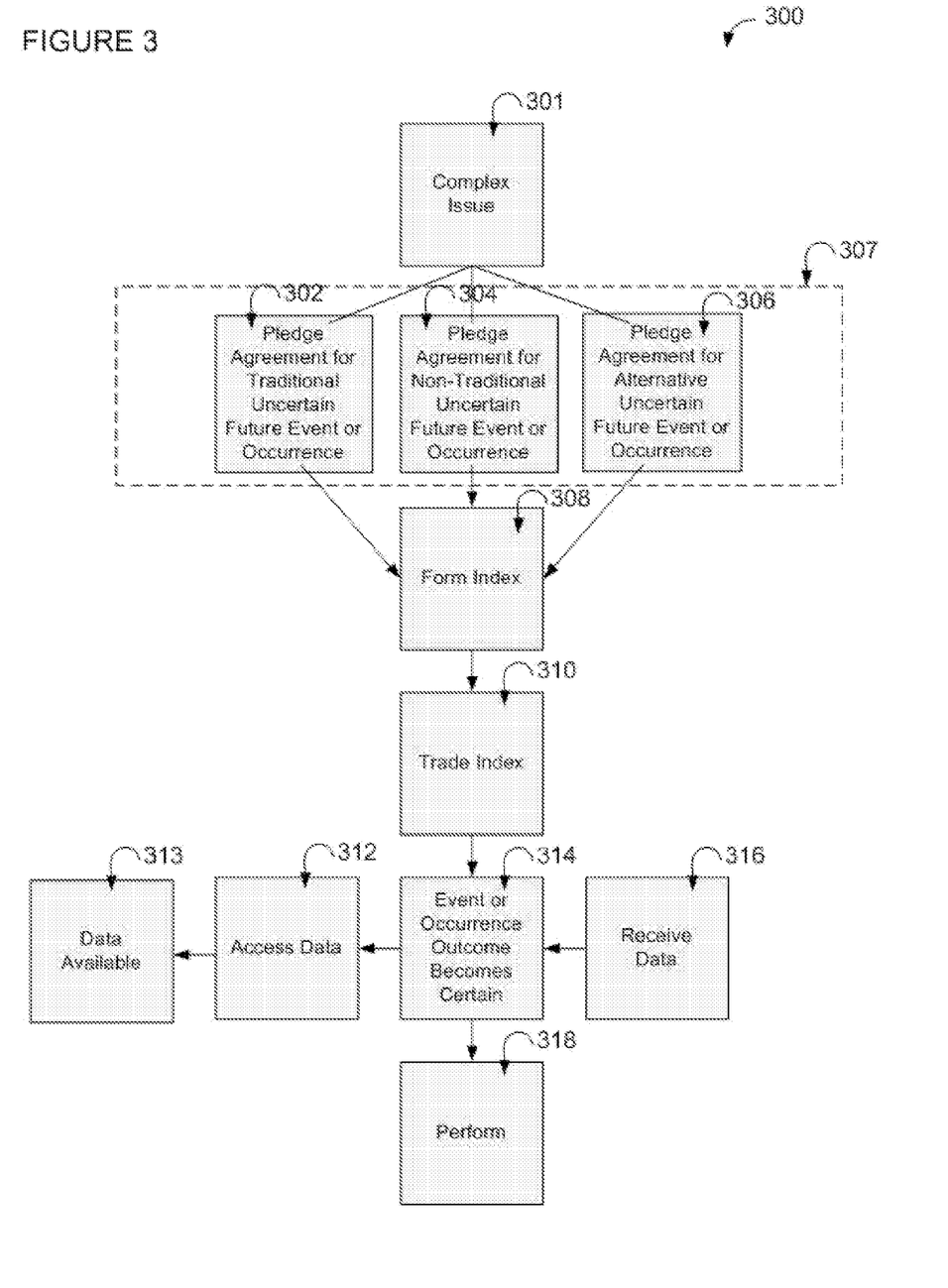
FIG. 3 is a block diagram of a method for establishing an index in a personalized exchange market for any uncertain future event or occurrence in accordance with an embodiment of the invention.

FIG. 3 is a block diagram of a method for establishing an index in a personalized exchange market for any uncertain future event or occurrence in accordance with an embodiment of the invention. In one embodiment, method 300 includes pledging on any traditional uncertain future event or occurrence at block 302, pledging on any non-traditional uncertain future event or occurrence at block 304, and/or pledging on any alternative uncertain future event or occurrence at block 306 to form various pledge agreements. Steps in method 300 may include one or more embodiments as discussed in relation to FIG. 1. In one particular embodiment, any of the traditional, non-traditional, or alternative uncertain future events or occurrences may be components of a broader complex issue at block 301. A traditional uncertain future event or occurrence encompasses macro-level subject matter and may include, but is not limited to, inflation changes, epidemic outbreaks, legislation changes, climate changes, or any other relatively broad subject matter, which may or may not be accounted for by a particular agent, person, company, etc. A non-traditional uncertain future event or occurrence encompasses micro-level subject matter and may include, but is not limited to, changes in market share for a company, housing prices, interest rates, success of a division or product-line within a larger company, total number of patents or patent applications owned by a particular entity, average patent outcome, average length of prosecution, number of patent infringement suits, most popular patents, most popular patents in a particular field, most patents owned by company, top law firms, most successful patent prosecution law firms, or any other similar subject matter. An alternative uncertain future event or occurrence encompasses narrow exotic subject matter and may include, but is not limited to, steroid testing on a particular athlete, raw ingredient demand, success of a particular patent application, value of a patent, or any other subject matter that is not regularly or commonly known, made available, or otherwise disseminated. The traditional, non-traditional, and alternative descriptive labels are of relative degree and thus categorization of uncertain future events or occurrences may be different from various perspectives. Further, the traditional, non-traditional, and alternative descriptive labels may be combined or broken apart and may be labeled differently. Additionally, uncertain future events or occurrences may be shifted among traditional, non-traditional, and alternative (or any other) categories. For example, the events or occurrences may be shifted among categories when pledge agreement activity meets a certain threshold. In certain embodiments, pledgors are rewarded for increases in popularity of their pledge subject matter.

In one embodiment, the various pledge agreements metaphorically form a mosaic at block 307, the mosaic being a combination of pledge agreements relating to any number of traditional, non-traditional, or alternative uncertain future events or occurrences. In one particular embodiment, fewer or greater numbers of traditional, non-traditional, or alternative pledge agreements are present, either individually or in aggregate. The pledge agreements are then combined at block 308 to create an index or portfolio of various pledge agreements. It will often be the case that the index will include logical combinations of pledge agreements, although the pledge agreements may encompass any subject matter. For instance, the index may include a traditional pledge agreement on inflation, a non-traditional pledge agreement on interest rates, and an alternative pledge agreement on a particular house price at the time of sale. Any number of combinations of pledge agreements is possible in the index at block 308.

In one particular embodiment, the index formed at block 308 or portions thereof are optionally tradable at block 310. In another particular embodiment, any of the pledge agreements included in the index are optionally tradable to alter the contents of the index. At block 314, one or more of the uncertain future events or occurrences associated with pledge agreements included in the index become certain. In one embodiment, the certainty is determined by receiving verification data at block 316. In a particular embodiment, the source of verification data at block 316 is predetermined at the time a particular pledge agreement is initially formed. Thus, one pledge agreement within the index may mature while other pledge agreements remain uncertain; although it is possible for all pledge agreements within the index to mature at relatively the same time. Additional pledge agreements may or may not replace the matured pledge agreements. In one particular embodiment, additional pledge agreements may be added to or traded in the index at block 308 at any time. In one embodiment, the method 300 includes performing at block 318 upon the maturation of a pledge agreement. In one embodiment, information from any step in the method 300 is optionally analyzed at block 312 and/or optionally made available at block 313. Method 300, or any component thereof, is optionally repeatable.

In one particular embodiment, method 300 is combinable with the method of hedging described in relation to FIG. 2. Thus, an index, or portion of an index formed in method 300, may be purchased at block 206 as part of an overall hedging strategy in method 200.

Figure 4:
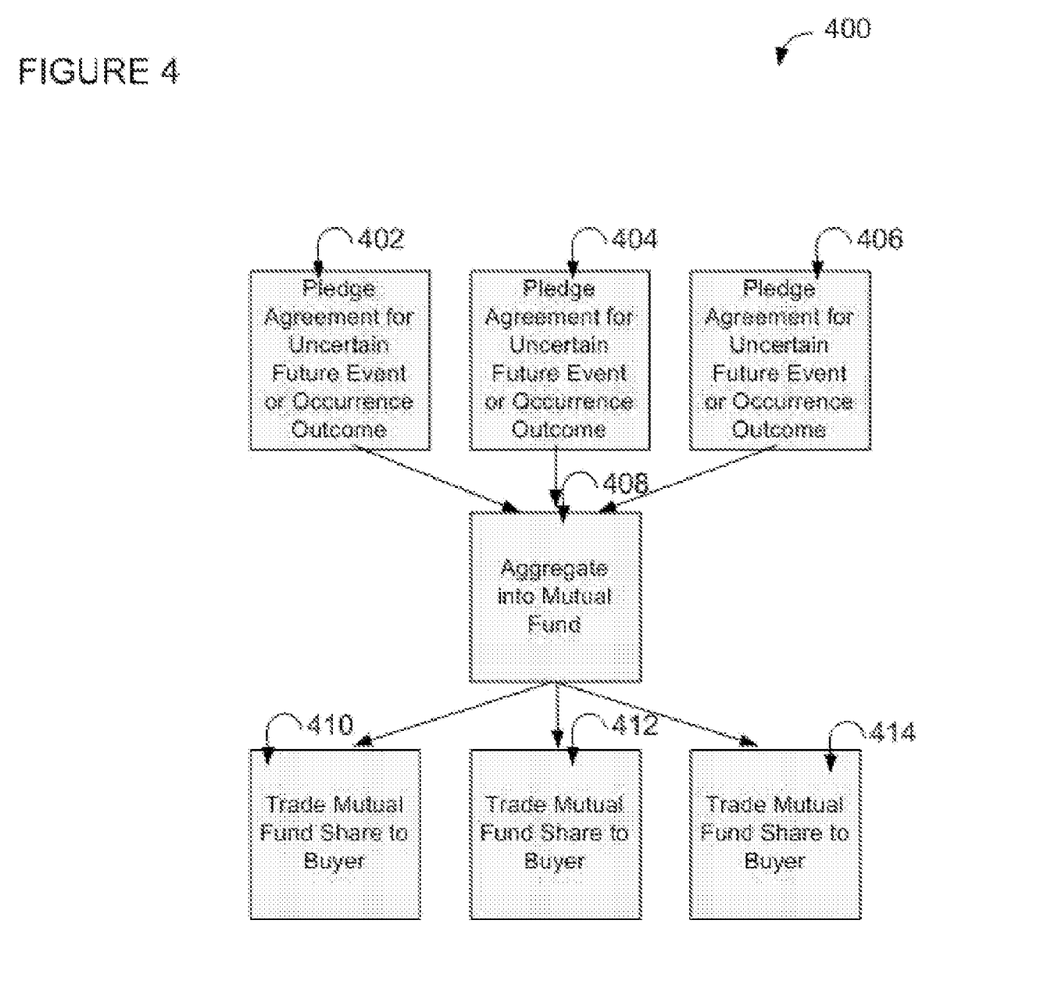
FIG. 4 is a block diagram of a method for establishing a mutual fund in a personalized exchange market for any uncertain future event or occurrence in accordance with an embodiment of the invention.

FIG. 4 is a block diagram of a method for establishing a mutual fund in a personalized exchange market for any uncertain future event or occurrence in accordance with an embodiment of the invention. In one embodiment, method 400 includes forming pledge agreements for a plurality of uncertain future events or occurrences at blocks 402, 404, and 406. This step or other steps in method 400 may include one or more embodiments of method 100 as described in relation to FIG. 1. In one particular embodiment, the pledge agreements are for traditional, non-traditional, or alternative uncertain future events or occurrences or a combination thereof as described in certain embodiments of FIG. 3. In another particular embodiment, the pledge agreements are logically related according to industry, subject matter, risk level, or any other useful classification. For example, the pledge agreements 402, 404, and 406 may be for the success or non-success of a drug, its ingredients, its relevant patent applications, and the FDA approval process, permitting individual pledge agreements to be aggregated to an even more personalized pledge agreement. In certain embodiments, fewer or greater numbers of pledge agreements are present. At block 408, the plurality of pledge agreements are aggregated into a mutual fund.

In one particular embodiment, the mutual fund is managed, whereby individual pledge agreements are evaluated, traded, closed, purchased, paid out, or otherwise managed.

In one embodiment, shares of the mutual fund are then traded to at least one buyer at blocks 410, 412, or 414. In one particular embodiment, the shares are tradable. Accordingly, method 400 permits a buyer to own a cross section of desired pledge agreements for uncertain future events or occurrences without having to purchase or trade individual pledge agreements or to independently balance a portfolio of pledge agreements. In one embodiment method 400 includes any feature or function present or utilized in financial markets.

In one particular embodiment, method 400 is combinable with the method of hedging described in relation to FIG. 2. Thus, a mutual fund, or portion of a mutual fund, may be purchased at block 206 as part of an overall hedging strategy in method 200.

Figure 5:
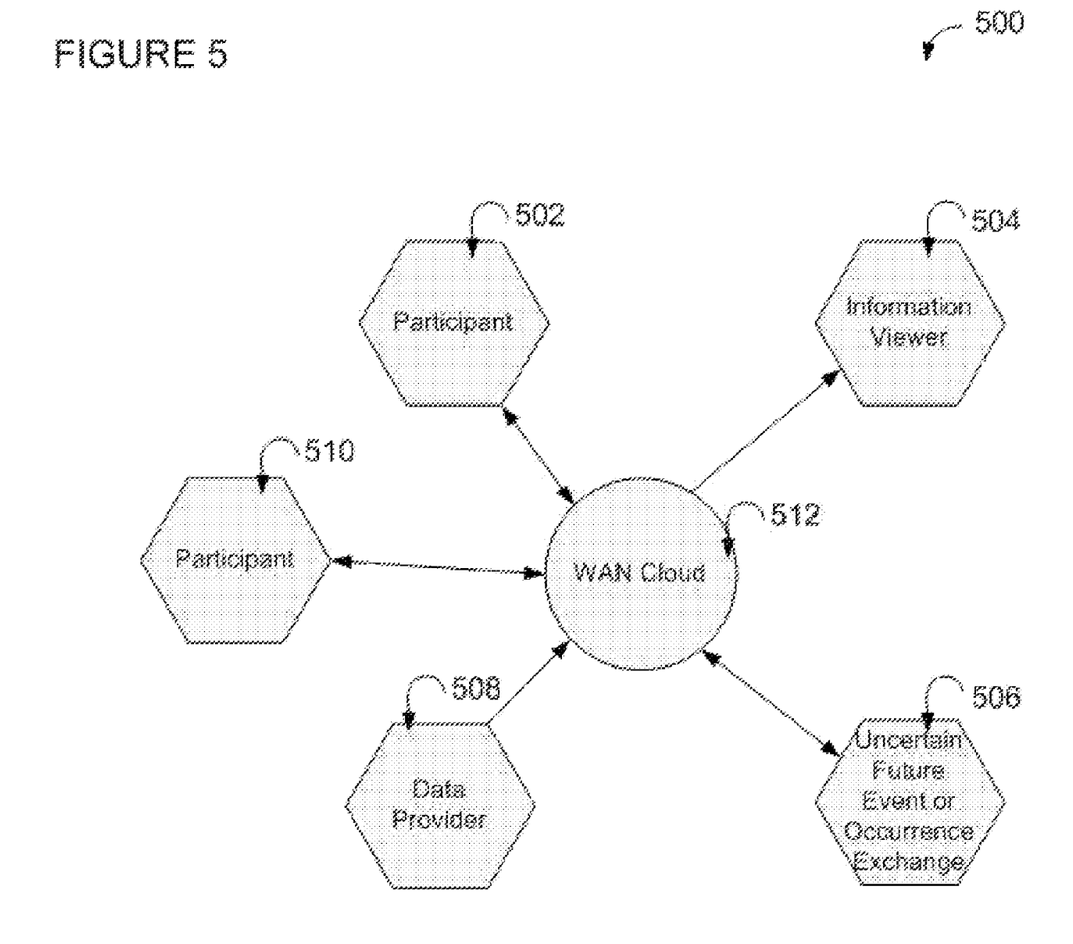
FIG. 5 is a diagram of a system for establishing a personalized exchange market for any uncertain future event or occurrence in accordance with an embodiment of the invention.

FIG. 5 is a diagram of a system for establishing a personalized exchange market for any uncertain future event or occurrence in accordance with an embodiment of the invention. In one embodiment, system 500 includes a plurality of participants 502, 510 and an uncertain future event or occurrence exchange 506 coupled via a wide area network cloud 512. In another embodiment, system 500 additionally includes one or more data providers 508 and/or one or more information purchasers 504. The system 500 implements one or more embodiments as described in relation to FIGS. 1-4 and therefore may include certain embodiments discussed with reference to those figures.

In one embodiment, the plurality of participants 502, 510 are individuals who or entities that would like to transfer risk, are interested in accepting risk, are speculators, are interested in building an index fund, are interested in acquiring shares or fractional shares of a mutual fund, or are interested in trading in pledge agreements. In another embodiment, any of the participants 502, 510 are coupled via the wide area network 512 to permit communication. The wide-area network 512 may include the internet, a local area network, P2P (person-to-person), satellite communications, wireless communications, digital communications, analog communications, optical communications, radio communications, smoke signals, nanotechnology, a combination thereof, or any other known or later discovered technology. In one particular embodiment, the wide-area network cloud 512 is substituted in whole or in part by direct point-to-point or manual communications among any of the entities of the system 500.

In yet another embodiment, the uncertain future event or occurrence exchange 506 is coupled to the wide-area network cloud 512 to permit communication among itself and the plurality of participants 502, 510. The uncertain future event or occurrence exchange 506 facilitates pledge agreement formation and/or exchanges for any uncertain future event or occurrence among any of the plurality of participants 502, 510.

In an alternative embodiment, the data provider 508 is coupled to the wide-area network cloud 512 to provide information used to verify the certainty of previously uncertain future events or occurrences. In one particular embodiment, the data provider 508 is a proprietary data provider or has proprietary information. Alternatively, in another embodiment, the data provider 508 is a public or private source. In yet another embodiment, the data provider 508 is a combination of a proprietary, public, and/or private sources. For example, the data provider 508 may publish or make available data to support the outcome of a particular pledge agreement. In one particular embodiment, the data provider 508 is omitted or included with the exchange 506, the information purchaser 504, or any other entity.

In yet a further embodiment, the information viewer 504 is coupled to the wide-area network cloud 512 and views, acquires and/or analyzes any type of available information from the system 500. For example, the available information may include the price of a given pledge or pledge agreement, aggregate prices of pledge agreements, spreads in prices of pledge agreements, trade volumes of pledge agreements, or any other available information. In one particular embodiment, the available information is accessible to information consumers. In another particular embodiment, the available information is accessible to any of the participants. In yet another particular embodiment, the information viewer 504 is omitted or included with the exchange 506, the data provider 508, or any other entity.

Figure 6:
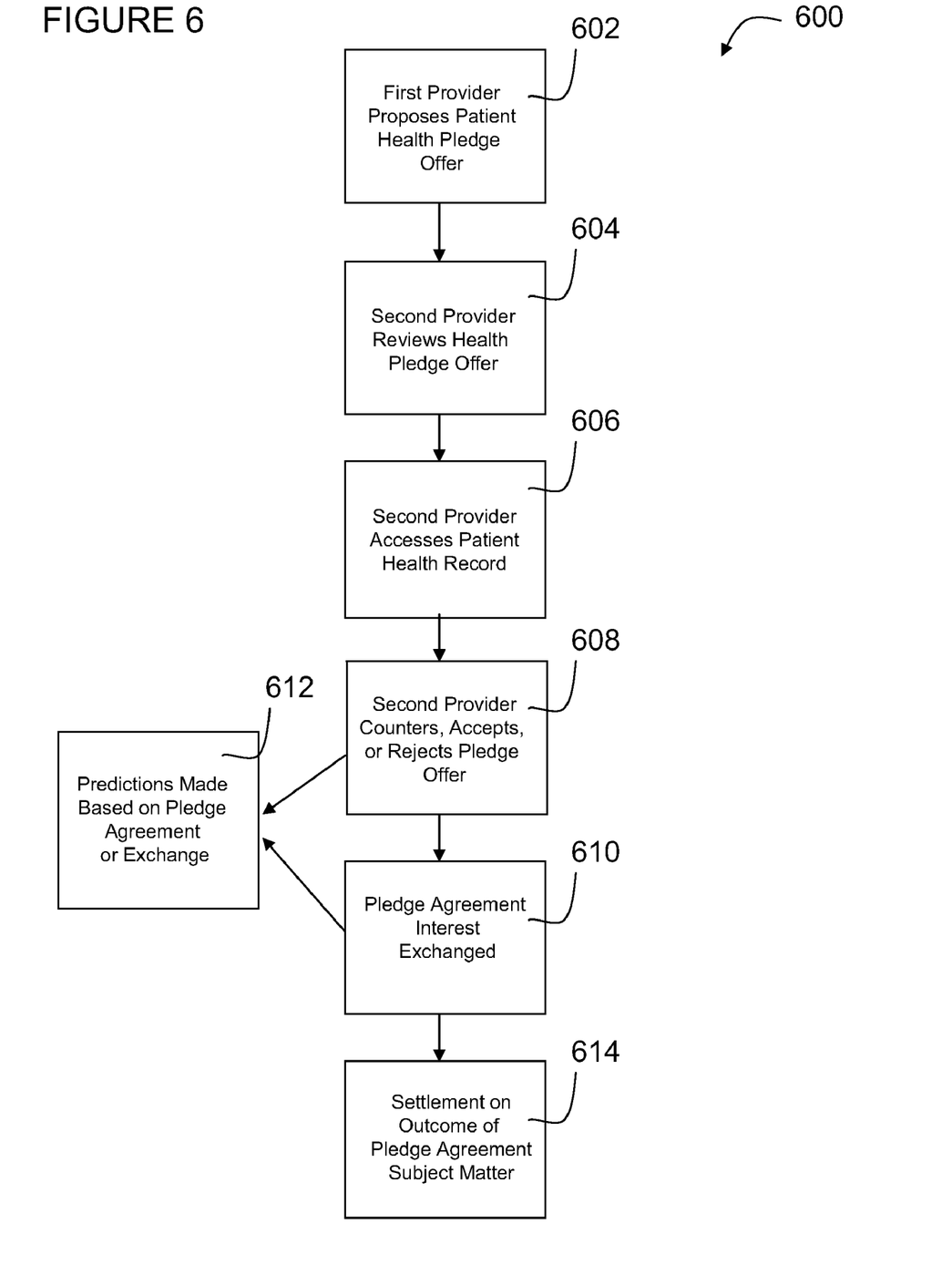
FIG. 6 is a diagram of a method for establishing a personalized exchange market for patient health information in accordance with an embodiment of the invention.

FIG. 6 is a diagram of a method for establishing a personalized exchange market for patient health information in accordance with an embodiment of the invention. In one embodiment, method 600 includes a first provider proposing a patient health pledge offer at block 602, a second provider reviewing the patient health pledge offer at block 604, the second provider accessing the patient's health record at block 606, the second provider counter-offering, accepting, or rejecting the patient health pledge offer at block 608, exchanging obligations under a pledge agreement at block 610, making predictions based on the pledge agreement or the exchange at block 612, and settling after pledge subject matter is certain at block 614.

In one embodiment, the proposing a patient health pledge offer at block 602 includes a first provider determining an uncertain subject matter that pertains to the health of a given patient. For example, the uncertain subject matter may be a diagnosis, a course of treatment, time to recovery, outcome of treatment, test results, or any other uncertain health subject matter. Once the uncertain health subject matter is determined, the first provider determines whether to pledge for or against the occurrence of the uncertain health subject matter and the value of the pledge. Alternatively, the value of the pledge may be set arbitrarily to a given unit, such as one unit. Accordingly, the patient health pledge offer could be a pledge of one unit that a given patient will develop colon cancer in the next 5 years. Thus, if the patient does develop colon cancer within 5 years, the first provider would be awarded one unit. After the uncertain health subject matter and the unit value are determined, the patient health pledge offer is available for acceptance, rejection, or a counteroffer by a second provider.

The reviewing the patient health pledge offer at block 604 includes a second provider accessing the patient health pledge offer created at block 602 and reviewing the health subject matter of the patient health pledge offer. In one particular embodiment, the patient health pledge offer is accessible only by certain providers or providers of a particular specialty. The limited access rules may be supplied by the first provider. For example, in the patient health pledge offer example above regarding colon cancer, access may be limited to gastroenterologists at a particular hospital location. This limited access ensures only desired and qualified individuals participate in the method 600 and protects the privacy of patient health information. In another particular embodiment, the patient health pledge offer is accessible via a computer network, which may be local, wide, or internet based thereby permitting the patient health pledge offer to be reviewed by a second provider who is not necessarily in close physical proximity to the first provider.

In order to further understand whether or not to participate in the patient health pledge offer, the second provider may access the patient health record relating to the patient health pledge offer at block 606. The patient health record is in an electronic medical record format in certain embodiments and may be fully or partially available for privacy protection purposes. The health record review permits the second provider to form a judgment as to whether the subject matter of the patient health pledge offer is likely or unlikely to occur. The judgment then provides the foundation from which the second provider accepts, rejects, or counters the patient health pledge offer. For example, following the example above, a thorough review of the patient's health record may reveal test results, a family history, and symptoms that indicate colon cancer is not likely to occur for the patient within five years. In this case, the second provider would logically accept the patient health pledge offer where the first provider feels colon cancer is likely and the second provider feels colon cancer is unlikely, the correct provider being compensated one unit of value. Thus, each of the providers is motivated by the award of value and has the opportunity to take educated positions.

In addition to accepting the patient health pledge offer, the second provider can amend the pledge offer and thereby submit a counter pledge-offer for the first provider to review or the second provider can reject the pledge offer at block 606. If the pledge offer is accepted, a pledge agreement is formed where the first provider believes one health outcome is certain and the second provider feels the opposite health outcome is certain. Each has a motivation to be correct in order to receive the agreed unit value and each has presumably based their position on a review of the patient's underlying health record. Alternatively, if the patient health pledge offer is materially amended, the first provider must review the amendment and accept the new patient health pledge offer. Finally, the second provider can reject the patient health pledge offer whereby no agreement is formed.

Once a pledge agreement is formed, either the first provider or the second provider may exchange their end of the agreement to an additional provider for value at block 610. The additional provider may be limited by person or specialty as discussed supra with regard to the initial patient health pledge offer. The value that an additional provider is willing to pay will be based on a perceived likelihood of the occurrence or non-occurrence of the subject matter that forms the basis of the patient health pledge agreement. If the pledge agreement payout is one unit of value for the occurrence of the subject matter and the additional provider believes the subject matter is highly likely to occur, the additional provider is more likely to pay closer to one unit of value for the chance to receive a full unit of value for being correct. Alternatively, if the payout is one unit of value for the non-occurrence of the subject matter and the additional provider believes the subject matter is unlikely to occur, the additional provider is more likely to pay closer to one unit of value for the chance to receive a full unit of value for being correct.

These motivated and educated exchanges of obligations under a pledge agreement are a source of prediction data as to whether the particular health subject matter is likely or unlikely to occur at block 612. The value that a provider is willing to pay for the opportunity to be awarded a unit value is proportionate to the odds that the underlying health subject matter will or will not occur. Accordingly, a first provider can determine what other providers believe is likely to occur simply by initiating a patient health pledge offer. The patient health pledge offer is accepted to form a pledge agreement and the obligations under the pledge agreement can be traded. The motivated and educated trades generate value data that is proportionate to the odds that the health subject matter will or will not occur. The odds can then be used to alter a course of treatment or more accurately advise a patient.

Once the subject matter of an underlying pledge agreement becomes certain, the providers obligated under the agreement at that time must settle the amount of the agreed unit value with each other. The agreed unit value can be cash or non-cash points that may themselves be redeemable for prizes or that are simply used for social recognition.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined by reference to the claims that follow.

What is claimed:

1. A method comprising:
    receiving an opinion regarding an eventuality;
    determining, using one or more microprocessors, a payout amount that is payable if the opinion regarding the eventuality is correct;
    publishing the opinion regarding the eventuality and the payout amount that is payable if the opinion regarding the eventuality is correct;
    receiving a first market based price for a right to the payout amount that is payable if the opinion regarding the eventuality is correct;
    facilitating for at least one additional market based price transfer of the right to the payout amount that is payable if the opinion regarding the eventuality is correct;
    publishing a trend over time between the first market based price and the at least one additional market based price;
    determining whether the opinion regarding the eventuality is correct; and
    facilitating the payout amount if the opinion regarding the eventuality is correct.

2. The method of claim 1, wherein the receiving an opinion regarding an eventuality comprises:
    receiving an opinion regarding an eventuality, the opinion being independently definable by a market participant without requiring consensus from another individual.

3. The method of claim 1, wherein the receiving an opinion regarding an eventuality comprises:
    receiving an opinion regarding an eventuality related to.

4. The method of claim 1, wherein the publishing the opinion regarding the eventuality and the payout amount that is payable if the opinion regarding the eventuality is correct comprises:
    publishing the opinion regarding the eventuality and the payout amount that is payable if the opinion regarding the eventuality is correct in association with related news and/or advertisement.

5. The method of claim 1, wherein the publishing the opinion regarding the eventuality and the payout amount that is payable if the opinion regarding the eventuality is correct comprises:
    publishing the opinion regarding the eventuality and the payout amount that is payable if the opinion regarding the eventuality is correct at a level of prominence that is fluctuatably determined based upon viewing volume of the opinion regarding the eventuality.

6. The method of claim 1, wherein the facilitating for at least one additional market based price transfer of the right to the payout amount that is payable if the opinion regarding the eventuality is correct comprises:
    facilitating at any point up to the eventuality transfer of the right to the payout amount that is payable if the opinion regarding the eventuality is correct.

7. The method of claim 1, further comprising:
    rewarding an author of the opinion regarding the eventuality at a predefined level of viewing volume of the opinion regarding the eventuality.

8. The method of claim 1, further comprising:
    facilitating redemption of virtual profits earned for goods and/or services.

9. The method of claim 1, further comprising:
    establishing a mutual fund by grouping the opinion regarding the eventuality with at least one additional opinion regarding a different eventuality;
    publishing the mutual fund composed of the opinion regarding the eventuality and the at least one additional opinion regarding the different eventuality;
    receiving a first mutual fund market based price for ownership of an interest in the mutual fund;
    facilitating for at least one additional mutual fund market based price transfer of the interest in the mutual fund; and
    publishing a trend over time between the first mutual fund market based price and the at least one additional mutual fund market based price.

10. The method of claim 1, wherein the receiving an opinion regarding an eventuality comprises:
    receiving a question regarding an eventuality.

11. The method of claim 1, wherein the receiving an opinion regarding an eventuality comprises:
    receiving an entertainment related question regarding an eventuality.

12. The method of claim 1, wherein the receiving an opinion regarding an eventuality comprises:
    receiving a sports related question regarding an eventuality.

13. The method of claim 1, wherein the receiving an opinion regarding an eventuality comprises:
    receiving a question of who will catch a bouquet thrown by a bride at a wedding.

14. A method comprising:
    receiving an opinion regarding a health condition and/or treatment eventuality of a particular patient;
    determining, using one or more microprocessors, a payout amount that is payable if the opinion regarding the health condition and/or treatment eventuality of the particular patient is confirmed;
    publishing the opinion regarding the health condition and/or treatment eventuality of the particular patient, the payout amount that is payable if the opinion regarding the health condition and/or treatment eventuality of the particular patient is confirmed, and health record information of the particular patient;
    receiving a first market based price for a right to the payout amount that is payable if the opinion regarding the health condition and/or treatment eventuality of the particular patient is confirmed;
    facilitating for at least one additional market based price transfer of the right to the payout amount that is payable if the opinion regarding the health condition and/or treatment eventuality of the particular patient is confirmed;
    publishing a trend over time between the first market based price and the at least one additional market based price;
    determining whether the opinion regarding the health condition and/or treatment eventuality of the particular patient is confirmed; and
    facilitating the payout amount if the opinion regarding the health condition and/or treatment eventuality of the particular patient is confirmed.

15. The method of claim 14, wherein the receiving an opinion regarding a health condition and/or treatment eventuality of a particular patient comprises:
    receiving an opinion regarding a health condition and/or treatment eventuality of a particular patient, the opinion being independently definable by a healthcare provider without requiring consensus from another individual.

16. The method of claim 14, wherein the receiving an opinion regarding a health condition and/or treatment eventuality of a particular patient comprises:
    receiving an opinion that a particular patient has a certain disease and/or cancer.

17. The method of claim 14, wherein the publishing the opinion regarding the health condition and/or treatment eventuality of the particular patient, the payout amount that is payable if the opinion regarding the health condition and/or treatment eventuality of the particular patient is confirmed, and health record information of the particular patient comprises:

publishing to selected healthcare providers and/or to healthcare providers of a selected specialty the opinion regarding the health condition and/or treatment eventuality of the particular patient, the payout amount that is payable if the opinion regarding the health condition and/or treatment eventuality of the particular patient is confirmed, and health record information of the particular patient.

18. The method of claim 14, wherein the publishing the opinion regarding the health condition and/or treatment eventuality of the particular patient, the payout amount that is payable if the opinion regarding the health condition and/or treatment eventuality of the particular patient is confirmed, and health record information of the particular patient comprises:
publishing the opinion regarding the health condition and/or treatment eventuality of the particular patient, the payout amount that is payable if the opinion regarding the health condition and/or treatment eventuality of the particular patient is confirmed, and privacy-protected health record information of the particular patient.

19. The method of claim 14, further comprising:
providing a possible course of treatment and/or patient advice based on the first market based price and/or the at least one additional market based price.

20. A method comprising:
receiving an opinion that a particular patient has a certain disease and/or cancer, the opinion being independently definable by a healthcare provider without requiring consensus from another individual;
determining, using one or more microprocessors, a payout amount that is payable if the opinion that the particular patient has the certain disease and/or cancer is confirmed;
publishing to selected healthcare providers and/or to healthcare providers of a selected specialty the opinion that the particular patient has the certain disease and/or cancer, the payout amount that is payable if the opinion that the particular patient has the certain disease and/or cancer is confirmed, and privacy-protected health record information of the particular patient;
receiving a first market based price for a right to the payout amount that is payable if the opinion that the particular patient has the certain disease and/or cancer is confirmed;
facilitating for at least one additional market based price transfer of the right to the payout amount that is payable if the opinion that the particular patient has the certain disease and/or cancer is confirmed;
publishing a trend over time between the first market based price and the at least one additional market based price;
providing a possible course of treatment and/or patient advice based on the first market based price and/or the at least one additional market based price;
determining whether the opinion that the particular patient has the certain disease and/or cancer is confirmed; and
facilitating the payout amount if the opinion that the particular patient has the certain disease and/or cancer is confirmed.

* * * * *